Figure 1:
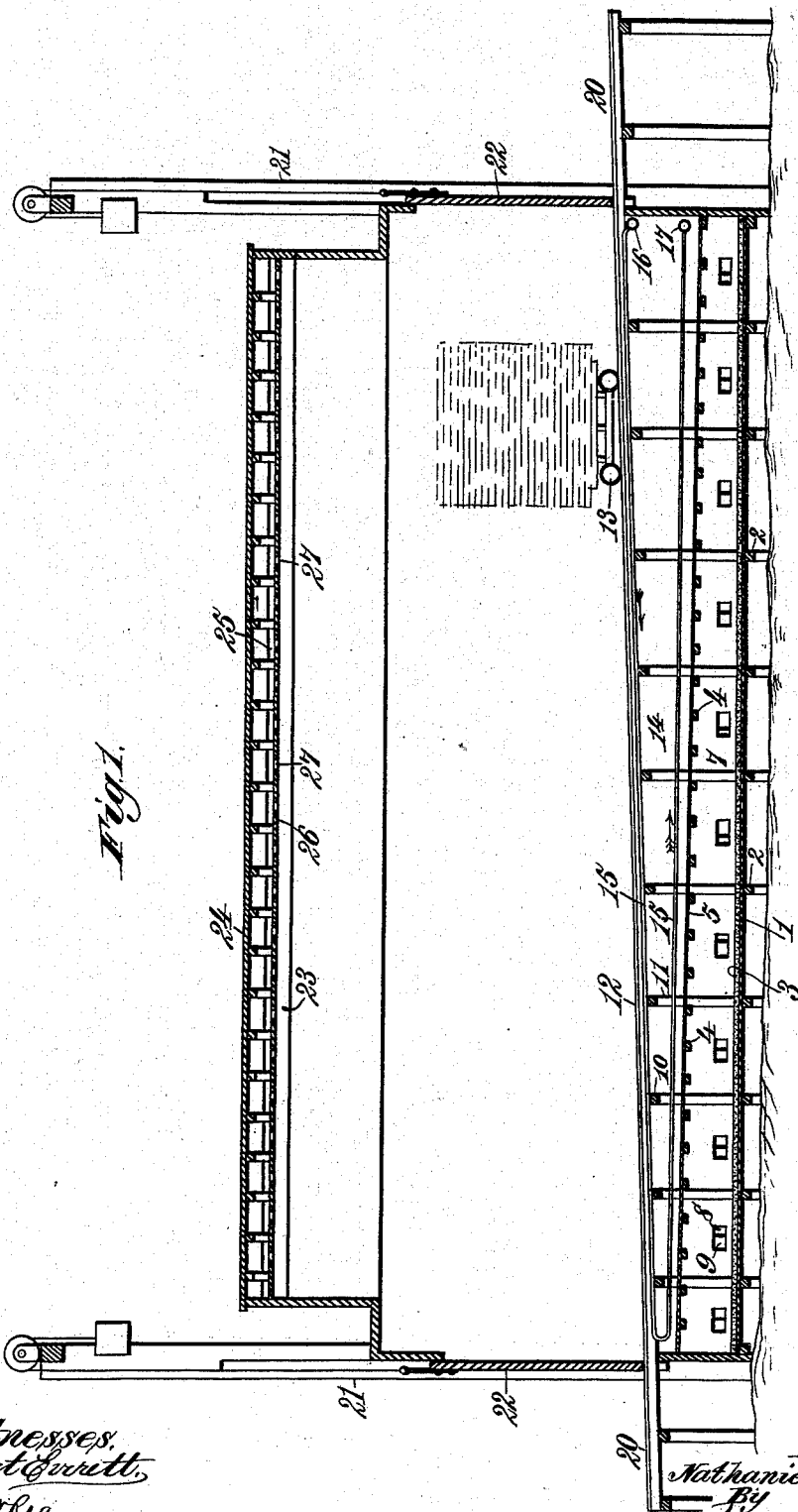

(No Model.) 3 Sheets—Sheet 1.
N. T. TORBERT.
KILN FOR DRYING LUMBER.

No. 505,011. Patented Sept. 12, 1893.

Witnesses:
Robert Everett.
E. M. Rea.

Inventor:
Nathaniel T. Torbert.
By Inwood L. Norris.
Atty.

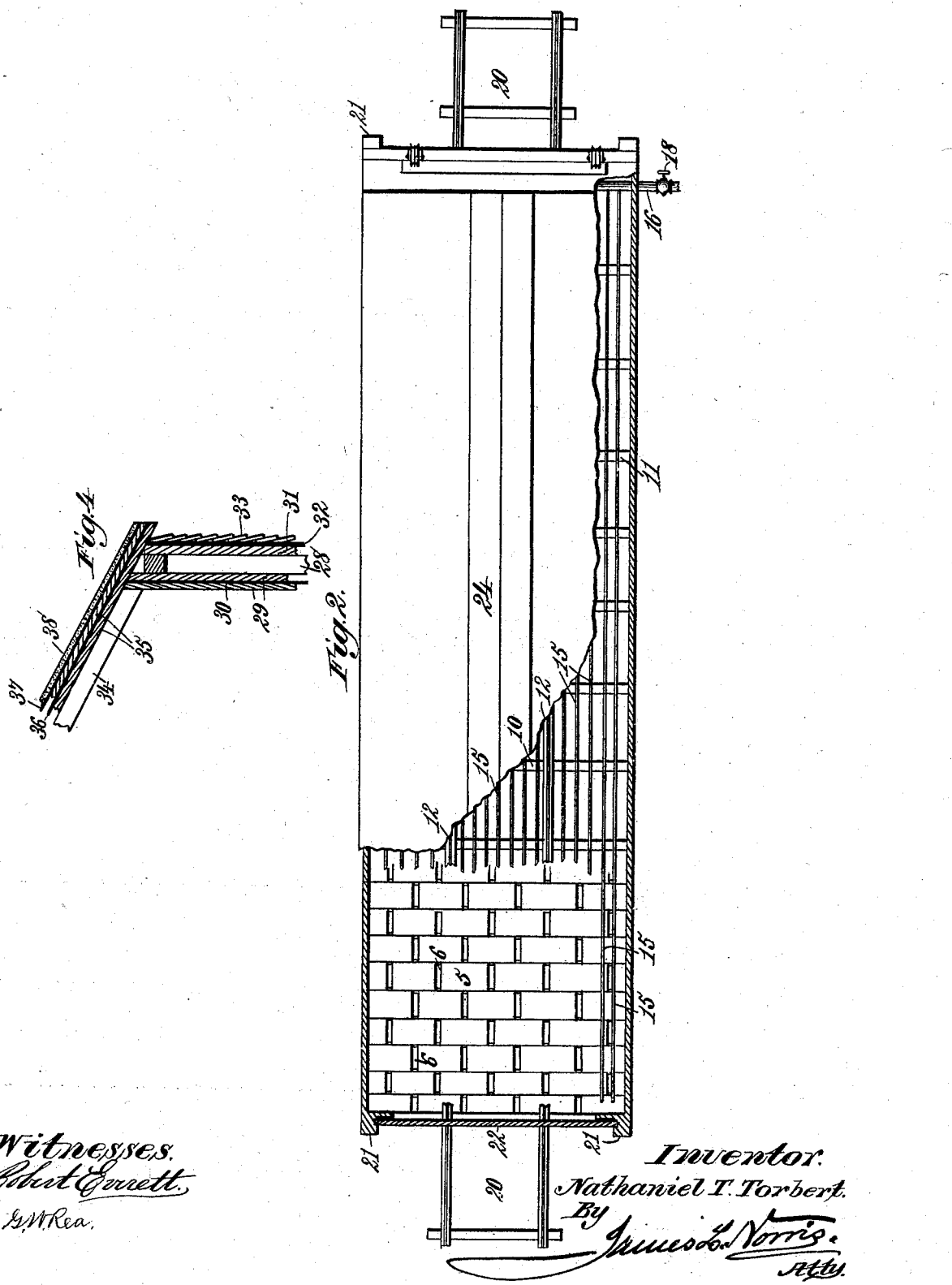

(No Model.)  3 Sheets—Sheet 3.
N. T. TORBERT.
KILN FOR DRYING LUMBER.
No. 505,011.  Patented Sept. 12, 1893.
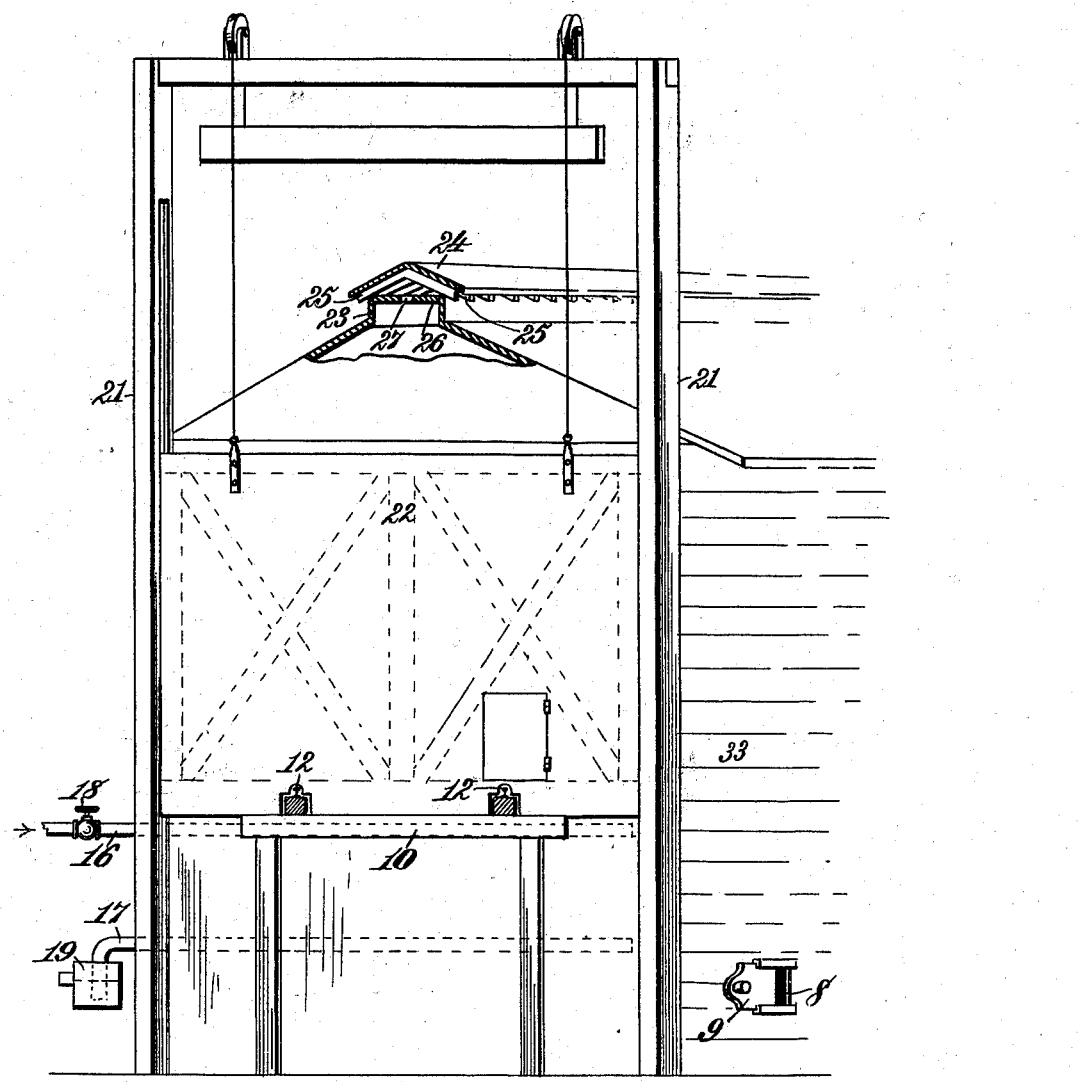

UNITED STATES PATENT OFFICE.

NATHANIEL T. TORBERT, OF LAUREL, DELAWARE.

KILN FOR DRYING LUMBER.

SPECIFICATION forming part of Letters Patent No. 505,011, dated September 12, 1893.

Application filed December 8, 1892. Serial No. 454,514. (No model.)

*To all whom it may concern:*

Be it known that I, NATHANIEL T. TORBERT, a citizen of the United States, residing at Laurel, in the county of Sussex and State of Delaware, have invented new and useful Improvements in Kilns for Drying Lumber, &c., of which the following is a specification.

This invention relates to kilns for use in drying lumber and other material and has for its object to provide a uniform distribution and movement of heated air throughout the drying chamber and to effect removal of the moisture laden air at various points in the roof of the kiln whereby the air is not allowed to remain so long in contact with the material to be dried as to become completely saturated with moisture nor to move in such directions as to carry moisture from one body of material to another.

The invention consists in the peculiar features of construction and novel combination of devices in a kiln especially designed for the rapid drying of lumber as hereinafter more particularly described.

In the annexed drawings Figure 1 is a vertical longitudinal section of a drying kiln provided with my improvements. Fig. 2 is a sectional partly broken away plan of the interior of the kiln. Fig. 3 is a partly sectional end elevation of the kiln. Fig. 4 is a detail sectional view.

Referring to the drawings the numeral 1 designates the bottom floor of the kiln composed of boards laid on joists 2 and covered with a layer of sand 3 which serves to make the floor tight so as to exclude dampness rising from the ground underneath and at the same time protects the floor from any danger of injury by fire. The walls of the drying kiln may be constructed of studding sheathed inside and out with planking, and the outside covered with tar paper and weather boarded. At a suitable distance above the sand covered bottom floor 1 is placed a suitable framing of joists 4 to support an air distributing floor 5 which is preferably composed of tin plate in sheets of suitable dimensions, say twenty by twenty eight inches, spaced apart at intervals to afford one inch apertures 6 for the free upward passage of currents of air at equidistant intervals throughout the kiln. The space between the sand covered bottom floor 1 and tin air distributing floor 5 forms a cold air chamber 7 which is provided on each side with air inlets 8 formed in the side walls of the kiln. These air inlets may be provided with slides or shutters 9 to regulate the inlet of air as required. Above the air distributing floor 5 is a framing 10 that may be sustained by props 11 and so constructed as to form a trestle that will afford adequate support for one or more tracks 12 on which to run cars or trucks 13 for carrying the lumber or other material to be dried. The framing 10 and tracks 12 are preferably inclined downward from the entrance end of the kiln to its exit end so as to facilitate movement of a loaded car or truck into the kiln and its gradual progress through the same during the operation of drying the lumber or other material and to make room for succeeding cars. The space below the tracks 12 and above the air distributing floor 5 constitutes an air heating chamber 14 in which is placed a number of longitudinally arranged steam pipes 15 for heating the kiln. The steam pipes 15 are preferably bent on themselves at one end of the kiln and are connected at the other end of the kiln to drums or headers 16 and 17 arranged across the kiln, one above the other at a suitable distance apart. The upper header 16 is preferably employed as a steam inlet drum and the lower header 17 is then arranged as an exit drum for condensed steam. It will be observed that the upper branches of the steam pipes 15 are inclined from the upper drum or header 16 while the lower branches are inclined toward the lower drum or header 17 thereby facilitating drainage of any water of condensation that would otherwise collect in the pipes and impede the proper heating of the kiln. The upper drum or header 16 may be provided at a suitable point with an inlet cock or valve 18 to control the supply of steam and the lower header or drum 17 should be provided with a steam trap 19 to let off the water of condensation without loss of steam and consequent waste of heat. The framing or trestle 10 that supports the car tracks may be extended outside the kiln at each end to form platforms 20 for temporarily supporting the cars while being loaded or unloaded. At each end of the kiln is a vertical guideway 21 for a weighted vertically sliding door 22 of any suitable or well known construction and adapted to confine the heated air within the kiln.

The roof of the kiln should be of water tight construction, preferably felted and cemented, and is finished at the top with a central longitudinally arranged uptake 23 that is extended nearly or quite the entire length of the kiln. This longitudinal uptake or ventilator 23 is provided with an overhanging or laterally projecting ridge roof 24 so constructed as to provide on each side, between the ventilator roof and its supporting rafters, a series of spaces or openings 25 for the exit of moisture laden air from the interior of the kiln. In the upper part of the uptake 23 below the lateral moist air exits 25 is placed a horizontally arranged diaphragm or plate 26 provided with a number of openings 27 disposed at suitable intervals and through which the moist air in the kiln is allowed to escape on its way to the lateral outer exits before mentioned.

It will be observed that the air admitted through the lower lateral air inlets 8 on both sides of the kiln and passing thence into the cold air chamber 7 will escape freely in an upward direction through the numerous openings 6 in the tin air distributing floor 5 and be thereby rapidly distributed throughout the air heating chamber 14 in contact with all the steam pipes 15 whereby it becomes thoroughly and uniformly heated in a short time. The heated and dry air passes at once and continuously from every part of the air heating chamber 14 in direct upward currents all over the kiln and to every part thereof and coming in contact with the lumber, or other material to be dried, rapidly abstracts the moisture therefrom and carries it upward and off through the longitudinally arranged ventilator in the roof. The tin air distributing floor 5 at the bottom of the air heating chamber being a good conductor of heat serves to maintain a uniform temperature throughout the air heating chamber and by reason of the equidistant arrangement of air spaces or openings in said floor the upward currents of air from the cold air chamber 7 are uniformly distributed and become rapidly raised to the required temperature in circulating between and around the steam pipes. By the provisions thus made for an ample and equalized supply of air at both sides of the lower part of the kiln and its uniform distribution in upward currents throughout the whole bottom of the air heating chamber whence the heated air passes directly upward all over the kiln the objections incident to introducing the air at one side or end of a kiln and discharging it at the opposite side or end are wholly obviated and there is no liability of carrying moisture laden air from one body of lumber to another. It is, therefore, obvious that a kiln of the construction described is well adapted to the rapid and thorough drying of lumber and other material.

While I prefer to construct the air distributing floor 5 of tin plates suitably perforated or spaced apart to afford passage for upward currents of air directly and immediately into all parts of the air heating chamber 14 at once I would have it understood that, instead of tin, any other suitable material may be employed in the construction of this air distributing floor.

It will be observed that air is supplied to the cold air chamber 7 and thence through all parts of the air distributing floor 5 to the air heating chamber 14 by natural draft alone, thus avoiding the expense of an engine and blower. In the air heating chamber 14 the direct upward currents of air issuing through all parts of the air distributing floor 5 are brought at once into immediate contact with the extensive heating surfaces afforded by the closely arranged steam pipes 15 and the air is thus rapidly dried and heated before rising into the drying chamber of the kiln. By connecting these steam pipes with an inlet header having a cock 18 for controlling the steam supply and with an outlet header having a steam trap 19 a large economy is effected in the heating of the kiln and at the same time the temperature of the kiln can be so controlled as to avoid any liability of injury to the material under treatment.

A large economy of heat is effected by constructing the kiln with non-conducting walls and roof as shown in Fig. 4. The walls may be built of studding 28 having a double inner sheathing 29 inclosing a layer of paper 30; and on the outside the sheathing 31 is first covered with paper 32 and then with weather boarding 33, as shown. The rafters 34 support a double sheathing 35 between which is interposed paper 36 and the outside of the roof is then covered with felt 37 and a waterproof outer coating 38 of cement and gravel.

The construction of the kiln affords ready access to all parts for the purpose of repairs, whenever required and by reason of the manner in which the air is heated and uniformly distributed throughout all parts of the kiln in upward currents without circulating from one end to the other it is made possible to effect a thorough drying of lumber in much less time and with less labor and expense than by the employment of kilns of ordinary construction.

What I claim as my invention is—

1. In a drying kiln, the combination of a cold air chamber occupying the entire lower portion of the kiln and having air inlets on opposite sides, an air heating chamber extended the entire length and breadth of the kiln and having the whole of its top open to the body of the kiln, an air distributing floor intermediate the cold air chamber and air heating chamber, and provided throughout with equi-distant spaces or openings for the direct upward passage of air currents from the cold air chamber into the air heating chamber, steam pipes located in the air heating chamber above the perforated air distributing floor, and a longitudinally arranged ventilator located in the roof of the kiln and extended its entire length for direct exit of moist air from all parts of the kiln, substantially as described.

2. In a drying kiln, the combination of a cold air chamber located in the lower part of the kiln and provided with lateral air inlets, an air distributing floor supported above said cold air chamber and composed of metal plates spaced apart to afford openings for direct upward passage of air currents from the cold air chamber, an air heating chamber located immediately above the said air distributing floor and having the whole of its top open to the body of the kiln, car tracks supported at the top of the air heating chamber, steam pipes arranged in said air heating chamber, and a ventilator located longitudinally in the roof of the kiln and extended its entire length for direct exit of moist air from all parts of the kiln, substantially as described.

3. In a drying kiln, the combination of a cold air chamber occupying the entire lower portion of the kiln and having lateral air inlets, an air heating chamber open at the top and having an air distributing floor provided throughout with spaces or openings for the direct upward passage of air currents into the air heating chamber from all parts of the cold air chamber, steam pipes located within the air heating chamber to heat the air admitted through the perforated air distributing floor, tracks supported at the top of the air heating chamber, a longitudinally arranged ventilator extended the entire length of the roof and provided with lateral openings for exit of moist air and a perforated horizontally arranged plate located in said ventilator below its lateral air exits, substantially as described.

In testimony whereof I have hereunto set my hand and affixed my seal in presence of two subscribing witnesses.

NATHANIEL T. TORBERT. [L. S.]

Witnesses:
C. G. OTWELL,
L. A. MOORE.